United States Patent [19]

Hultquist et al.

[11] 3,801,154

[45] Apr. 2, 1974

[54] SELF-LOCKING CUSHION ASSEMBLY

[75] Inventors: Gordon Hultquist, Chicago; Patrick J. Tyler, Oak Park, both of Ill.

[73] Assignee: Coach and Car Equipment Corporation, Elk Grove Village, Ill.

[22] Filed: June 2, 1972

[21] Appl. No.: 259,244

[52] U.S. Cl. .................. 297/218, 5/353.1, 297/226
[51] Int. Cl. ............................................ A47c 31/02
[58] Field of Search ........... 297/218, 219, 225, 226, 297/229, 441, 457; 5/194, 353.1, 353.2

[56] References Cited
UNITED STATES PATENTS

| | | | |
|---|---|---|---|
| 2,612,941 | 10/1952 | Naughton, Jr. | 5/194 |
| 3,127,695 | 4/1964 | Driscoll et al. | 5/353.2 |
| 2,507,091 | 5/1950 | Carlson | 5/334 C |
| 1,962,215 | 6/1934 | Sallop | 297/226 |
| 3,596,989 | 8/1971 | Van Ryn et al. | 297/219 |
| 3,677,601 | 6/1972 | Morrison et al. | 297/441 |

FOREIGN PATENTS OR APPLICATIONS

| 1,201,822 | 1/1960 | France | 5/353.2 |
|---|---|---|---|

*Primary Examiner*—Bobby R. Gay
*Assistant Examiner*—Kenneth J. Dorner
*Attorney, Agent, or Firm*—Merriam, Marshall, Shapiro & Klose

[57] ABSTRACT

A simplified, self-locking cushion assembly, such as a seat or back cushion for a vehicle seat. The cushion assembly incorporates a flexible cover having a flap portion along each of its edges. The flexible cover extends around a resilient cushion filler resting upon a cushion support which is attached to the frame member of the cushion assembly. In assembly, the flexible cover is pulled tightly over the top of the resilient cushion filler, thereby compressing the cushion filler between the flexible cover and the cushion support. A part of the flexible cover flap portion is tucked between the frame member and cushion support. The force created by the tendency of the compressed cushion filler to expand against the cushion support secures the flap portion in that position.

4 Claims, 3 Drawing Figures

SELF-LOCKING CUSHION ASSEMBLY

BACKGROUND OF THE INVENTION

The present invention relates generally to a simplified cushion assembly, such as a seat or back cushion for a vehicle seat, which is readily assembled and disassembled thereby facilitating manufacture, maintenance and repair.

Cushion assemblies for vehicle seats conventionally comprise a rigid frame member over which is applied a support for a resilient cushion filler, such as urethane foam or coil springs. A fabric cushion cover is mounted over the resilient cushion filler and its outer edges are permanently secured to the rigid frame member by means of tacking or stapling or the like.

Because vehicle seats are subjected to a great deal of wear and abuse, they must be of sturdy construction. In particular, there must be a secure anchorage between the fabric cushion cover and the rigid frame member of the cushion assembly; and in conventional cushion assemblies, the fabric cushion cover is permanently secured to the rigid frame member.

In addition, conventional cushion assemblies are fairly complex in that they involve a number of skilled manufacturing operations in the mounting and securing of the fabric cushion cover to the rigid frame member. This, in turn, has required a substantial amount of manufacturing time and has necessitated utilization of skilled labor for the manufacturing process.

SUMMARY OF THE INVENTION

The present invention utilizes the same basic components now employed in conventional cushion assemblies and produces a sturdy cushion assembly, yet the assembly is relatively simple to manufacture. In addition, unlike conventional cushion assemblies, the present invention provides for easy disassembly once mounted in the vehicle. This feature greatly reduces the vehicle down time and labor expense associated with the cleaning and repair of conventional cushion assemblies.

The cushion assembly of the present invention incorporates a flexible cushion cover, generally made of a fabric or plastic material, having a flap portion along each of its edges. In assembly, the flap portions are tucked between the frame member and cushion support in such a manner that the resilient cushion filler is compressed and the force created by the tendency of the compressed cushion filler to expand against the cushion support secures the flap portions in that position.

Due to the fact that the flexible cushion cover is secured to the frame member by merely tucking its flap portions between the frame member and the cushion support without the use of any tacks or staples which would permanently secure it, the cushion cover may be readily removed and replaced for cleaning and repair once mounted in the vehicle by merely pulling out the tucked flap portions from between the frame member and cushion support. This assembly and disassembly procedure is simple enough to be performed rapidly by unskilled labor.

Other features and advantages are inherent in the structure and method claimed and disclosed or will become apparent to those skilled in the art from the following detailed description in conjunction with the accompanying drawings.

DESCRIPTION OF THE PREFERRED EMBODIMENT

Figure 1:
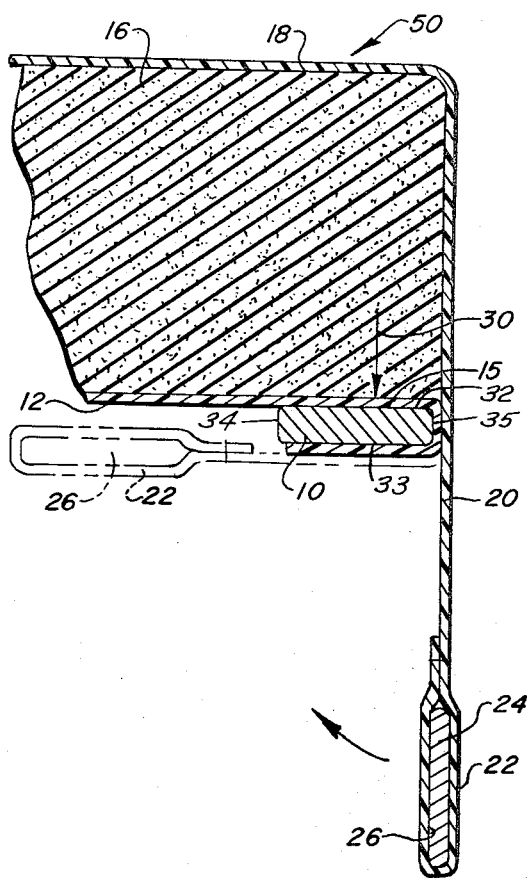
FIG. 1 is a fragmentary, sectional side elevational view of a cushion assembly constructed in accordance with an embodiment of the present invention showing the cushion assembly in an incompletely assembled condition.
Figure 2:
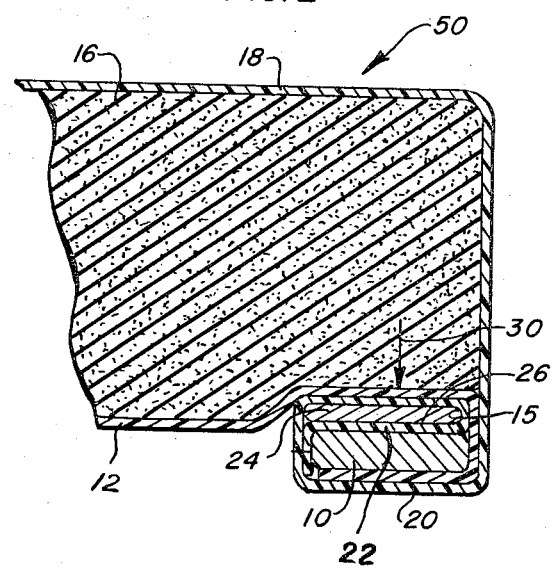
FIG. 2 is a view similar to FIG. 1 illustrating the cushion assembly in an assembled condition.
Figure 3:
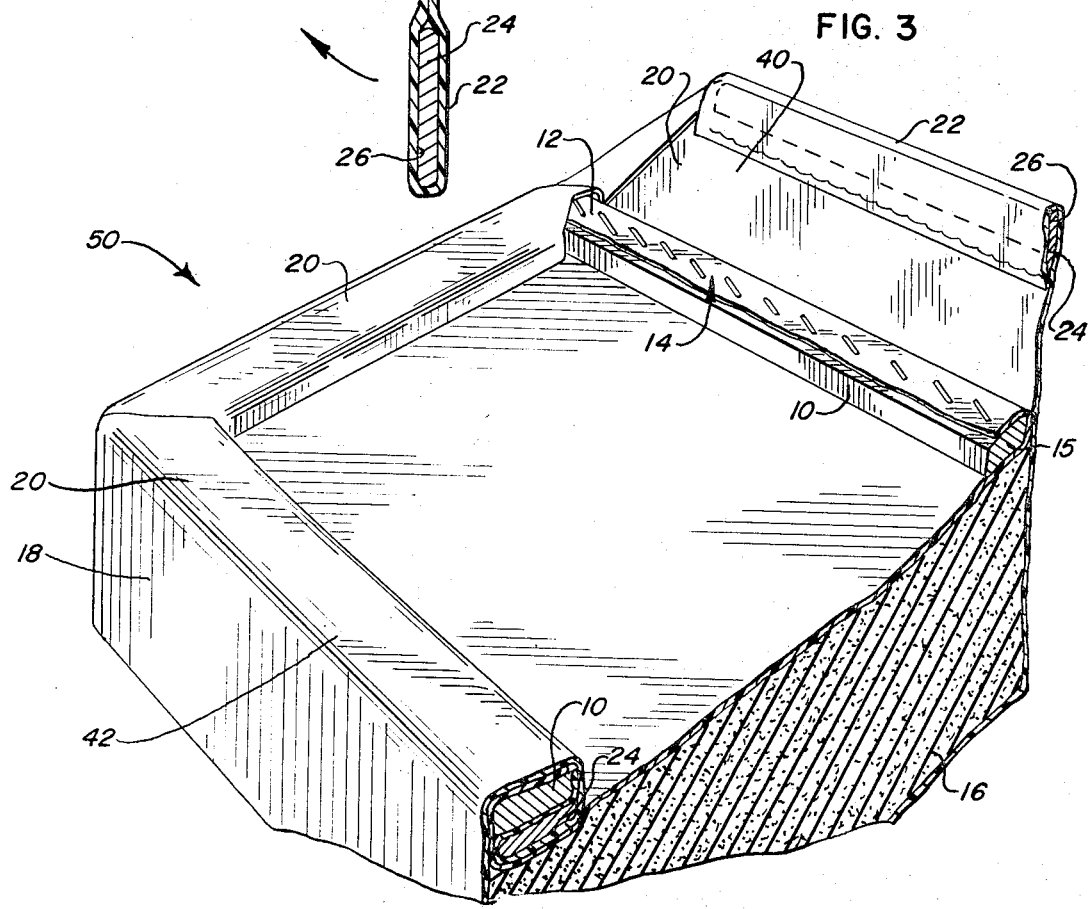
FIG. 3 is a fragmentary, perspective view of the cushion assembly.

Referring to FIGS. 1–3, there is illustrated an embodiment of a cushion assembly, indicated generally at 50, constructed in accordance with the present invention. Cushion assembly 50 includes a peripheral frame member 10, generally constructed of metal, wood or some other rigid material, having a cushion support 12 attached to it. As shown in FIG. 1, peripheral frame member 10 has a top 32, a bottom 33, an inside margin 34 and an outside margin 35. The cushion support is generally attached to frame member 10 by means of staples as shown at 14 in FIG. 3 or by tacks, glue or the like, and is made of canvas, vinyl, flexible metal sheets or the like. Cushion support 12 is attached to frame member 10 in such a way that a pocket 15 may be formed between the frame member 10 and cushion support 12.

Resting on cushion support 12 is a resilient cushion filler 16 around which is mounted a flexible cushion cover 18. Flexible cushion cover 18 has flap portions 20 which extend beyond frame member 10 when flexible cushion cover 18 is positioned over the top of cushion filler 16. Attached to the outer edge or terminal part 22 of flap portions 20 is a rigid insert or element 24. Rigid insert 24 may be made of wood, plastic, steel or any other rigid material, and may be attached to outer edge part 22 by inserting it into a presewn tunnel 26 formed along outer edge part 22 of flap portions 20 or it may also be attached by stapling, gluing or the like.

In assembly, flexible cushion cover 18 is positioned over the top of cushion filler 16 and each flap portion 20, having a rigid insert 24 attached at its outer edge part 22, is extended beyond frame member 10 as is shown in full lines in FIG. 1. The flexible cushion cover 18 is then pulled tightly over the top of cushion filler 16, thereby compressing the cushion filler 16 between the cushion cover 18 and cushion support 12, and the flap portions 20 are folded around the underside of frame member 10, as is illustrated in dash-dot lines in FIG. 1. The outer edge part 22 of each flap portion 20, having rigid insert 24 attached thereto, is then tucked into pocket 15 formed between frame member 10 and cushion support 12 as is illustrated in FIG. 2. The tucking of the outer edge part 22 of flap portions 20 into pocket 15 serves to maintain flexible cushion cover 18 in a tightly pulled position over the top of cushion filler 16 and, therefore, maintains the cushion filler 16 in a compressed condition. A force, illustrated by arrow 30, is created by the tendency of the resilient cushion filler 16 to return to its expanded condition. This force 30 acts upon cushion support 12 thereby locking outer edge part 22 of flap portions 20 securely between frame member 10 and cushion support 12.

In order to maintain a uniform appearance in the assembled flexible cushion cover 18, opposite flaps, such as flaps 40 and 42 illustrated in FIG. 3, are generally first tucked in place during assembly. The entire assembly operation may be performed without the use of tools. Likewise, by reversing the above-described assembly procedure and pulling outer edge part 22 of flap portions 20 from pocket 15, formed between frame member 10 and cushion support 12, top cover 18 may be easily and quickly removed from the cushion assembly without the use of tools. An upward force, generally applied by the workman's hand in the center of cushion support 12 against the resilient force of cushion filler 16, will aid in releasing outer edge part 22 from pocket 15 in the disassembly operation.

Another advantage of the cushion assembly of this invention is that, as the pressure against flexible cushion cover 18 is increased due to a vehicle seat occupant resting against it, the downward force of the vehicle seat occupant's weight upon flexible cushion cover 18 is transmitted through cushion filler 16 and against cushion support 12. This resulting force against cushion support 12 tends to lock outer edge part 22 more securely in pocket 15.

The foregoing detailed description has been given for clearness of understanding only, and no unnecessary limitations should be understood therefrom, as modifications will be obvious to those skilled in the art.

What is claimed is:

1. A cushion assembly comprising:
a peripheral frame member having a top, a bottom and outside and inside margins;
a resilient cushion filler;
means for supporting said resilient cushion filler on said frame member;
flexible means for covering said resilient cushion filler;
said flexible covering means having a flap portion;
said cushion supporting means being composed of flexible material;
the bottom of said cushion filler resting on said flexible cushion supporting means;
means mounting said flap portion for movement between a tucked position, in which the terminal part of said flap portion is engaged between the top of said frame member and said flexible cushion supporting means, and an untucked position, in which said terminal part of the flap portion is disengaged from between said frame member and said flexible cushion supporting means;
said flap portion extending sequentially first along the outside margin of said frame member, then along the bottom of said frame member, then along the inside margin of said frame member and then terminating between the top of the frame member and the bottom of said cushion filler, when the flap portion is in said tucked position;
the terminal part of said flap portion lying in a plane substantially parallel to the bottom of said cushion filler when the flap portion is in its tucked position;

and means for detachably securing the terminal part of said flap portion between said frame member and said flexible cushion supporting means when the flap portion is in its tucked position.

2. A cushion assembly comprising:
a peripheral frame member having a top, a bottom and outside and inside margins;
a resilient cushion filler;
means for supporting said resilient cushion filler on said frame member;
flexible means for covering said resilient cushion filler;
said flexible covering means having a flap portion;
means mounting said flap portion for movement between a tucked position, in which the terminal part of said flap portion is engaged between the top of said frame member and the bottom of said cushion filler, and an untucked position, in which said terminal part of the flap portion is disengaged from between said frame member and said cushion filler;

said flap portion extending sequentially first along the outside margin of said frame member, then along the bottom of said frame member, then along the inside margin of said frame member and then terminating between the top of the frame member and the bottom of said cushion filler, when the flap portion is in its tucked position;
the terminal part of said flap portion lying in a plane substantially parallel to the bottom of said cushion filler when the flap portion is in its tucked position;

means for detachably securing the terminal part of said flap portion between said frame member and said cushion supporting means when the flap portion is in its tucked position;
means on said supporting means and on said flexible covering means for compressing said resilient cushion filler into a compressed condition when the flap portion is in its tucked position;
and means on said supporting means and on said frame member for securing the terminal part of the flap portion in its tucked position when the resilient cushion filler is in its compressed condition.

3. A cushion assembly as recited in claim 1 wherein:

said flexible covering means has a plurality of flap portions; and
said securing means comprises means for detachably securing the terminal part of each of said flap portions between said frame member and said cushion supporting means.

4. A cushion assembly as recited in claim 1 and further comprising a rigid element attached to said terminal part of the flap portion.

* * * * *